May 19, 1931.  C. A. DONNELLY  1,806,524
GOGGLES
Filed July 6, 1929
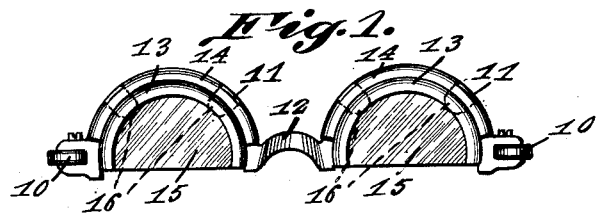
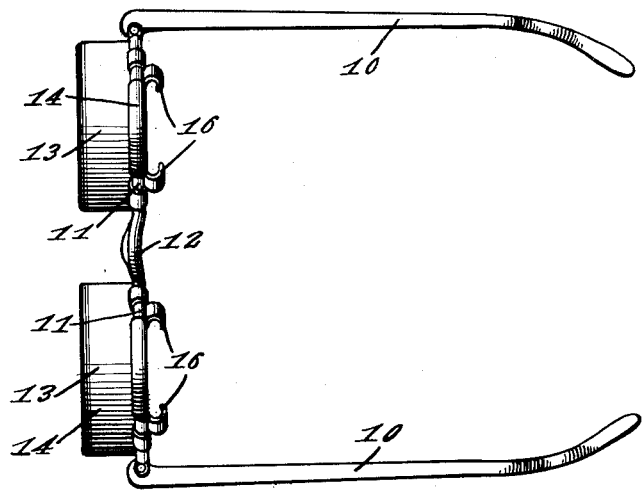
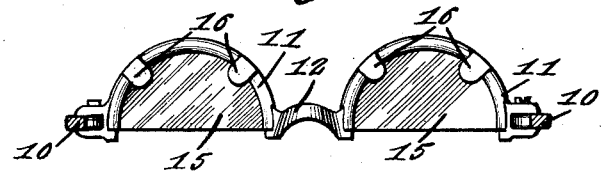
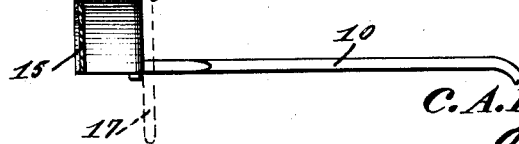
C. A. Donnelly, INVENTOR
BY Victor J. Evans
ATTORNEY Patented May 19, 1931

1,806,524

UNITED STATES PATENT OFFICE

CHARLES A. DONNELLY, OF CHICAGO, ILLINOIS

GOGGLES

Application filed July 6, 1929. Serial No. 376,313.

The present invention contemplates an improved goggle, primarily intended for use by automobile drivers, to shield the eyes from the detrimental effects of the sun rays as well as the glaring effect of approaching headlights on other vehicles, without in any way cutting off the vision of the user under any circumstances.

In carrying out the invention I also provide means whereby the goggles may be quickly and conveniently attached to or removed from an ordinary pair of spectacles should the occasion require.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views, and wherein:—

Figure 1 is a front elevation of the goggles forming the subject matter of the present invention.

Figure 2 is a top plan view.

Figure 3 is a view looking from the opposite side of the goggles from that shown in Figure 1.

Figure 4 is a sectional view showing how the goggles may be associated with the rims of an ordinary pair of spectacles.

Referring to the drawings in detail, 10 indicates the bows, 11 the rims which are semicircular in contour and which are connected by the usual nose-piece 12. Supported by each rim 11 and projecting forwardly therefrom is a semicylindrical shield of any suitable material indicated at 13, and it might here be stated that these shields may also vary in size without departing from the inventive idea. While the shields may be associated with the rims 11 in any suitable manner, they are preferably constructed from blanks of suitable material and have their edges rolled or curved over the rims as at 14. At the forward ends of the shields 13 are mounted lenses 15, which are of blended colors for the purpose of absorbing the rays of sun light or artificial light. Each lens is also of substantially semi-circular contour, and are arranged in the rims with the straight edge of each lens arranged a slight distance above the pupil of the eyes, so that the user may have an unobstructed vision beneath the lenses, or he may look through the lenses 15 to protect the eyes from the glaring effect of the sun light or artificial light as the occasion may be. The construction is such that the goggles absorb the numerous reflections, especially encountered in night driving, and thereby allow the user to drive with increased safety and comfort.

It will be noted upon inspection of Figures 2 and 4 that the rolled edge portion 14 of the shields 13 are cut away to provide a pluraliy of bendable loops or lugs 16, which can be conveniently employed for the attachment of the goggles to the rims 17 of an ordinary pair of eye-glasses, in cases where the user finds it necessary to also use the glasses in addition to the protecting goggles. It is only necessary to bend the lugs 16 over the rims 17, whereupon the shield or goggles will be held properly associated therewith, and can be just as easily removed from the ordinary spectacles as the occasion may require.

While it is believed that from the foregoing description the nature and advantages of the invention will be readily apparent, I desire to have it understood that I do not limit myself to what is herein illustrated and described, and that such changes may be resorted to when desired as fall within the scope of what is claimed.

What I claim is:—

Goggles of the character described comprising semi-circular rims, bows, therefor, a nose piece connecting said rims, semi-circular shields for each rim, each shield having one edge rolled upon itself to receive the adjacent rim and thereby support the shield in advance of the latter, a lens of corresponding shape supported by the outer end of each shield, the rolled portion of each shield being slit along spaced parallel lines to provide separated portions bent upon themselves to form hooks, said hooks being arranged in pairs on each rim and projecting rearwardly therefrom to support the goggles on rims of an ordinary pair of spectacles.

In testimony whereof I affix my signature.

CHARLES A. DONNELLY.